United States Patent Office 3,290,273
Patented Dec. 6, 1966

3,290,273
CURING OF UNSATURATED POLYMERS WITH TRIAZINE TRI(SULFENYL CHLORIDE) AND DERIVATIVES THEREOF
Morris B. Berenbaum and Riad H. Gobran, Levittown, Pa., assignors to Thiokol Chemical Corporation, Bristol, Pa., a corporation of Delaware
No Drawing. Original application Sept. 14, 1960, Ser. No. 55,859, now Patent No. 3,128,271, dated Apr. 7, 1964. Divided and this application July 11, 1963, Ser. No. 305,906
10 Claims. (Cl. 260—79.5)

This invention relates generally to curing agents for synthetic rubbers which prior to cure possess some degree of unsaturation, and more particularly to a novel type of curing agent capable of curing rubbers which are exceptionally difficult to cure by reason of the fact that they have low degrees of unsaturation.

This application is a division of our pending application Serial No. 55,859, filed September 14, 1960, now U.S. 3,128,271.

It is generally recognized that the copolymers of isobutylene and isoprene known as butyl rubber are comparatively difficult to cure, particularly in cases where the relative proportions of the monomers used are such that the copolymer has a low degree of unsaturation. In such cases an exceptionally active curing agent is required to effect a satisfactory cure within a reasonable time at an acceptable temperature. Also it is sometime desirable to cure butyl rubbers at or near room temperature. Here again a curing agent of greater than ordinary activity is required.

While the present curing agents are particularly useful in the curing of butyl rubber they may also be used, as pointed out more fully hereafter, in the curing of other elastomeric hydrocarbon polymers such as polybutadiene, polyisoprene and their copolymers. It is an object of the present invention to provide a novel rubber curing agent that is especially useful in the curing of butyl rubbers and that may also be used to cure other types of synthetic rubber. It is another object of the invention to provide a curing agent capable of satisfactorily curing rubbers having a low degree of unsaturation. It is a further object of the invention to provide a curing agent capable of curing difficultly curable rubbers at room temperature. It is a still further object of the invention to provide novel and useful methods of making the curing agents disclosed herein and using them in the curing of rubbers. Other objects of the invention will be in part obvious and in part pointed out hereafter.

The objects and advantages of the present invention are achieved in general by employing as curing agents triazine tri(sulfenyl chloride) and derivatives thereof having the structural formula:

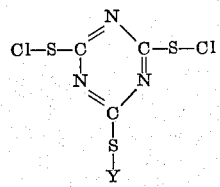

wherein Y is selected from the group consisting of Cl and —R.Cl, and R is an aliphatic hydrocarbon radical. It is evident that compounds within the scope of the foregoing structural formula may be either a symmetrical sulfenyl chloride of triazine or an asymmetrical derivative wherein one of the substituent groups has a terminal chlorine atom spaced from its associated sulfur atom by a hydrocarbon radical. It is to be noted that the latter chlorine is not a sulfenyl chlorine atom and therefore is not active in the cure of olefinic sites on the polymer to be cured. It has been found that the symmetrical compound is an exceptionally active curing agent for curing synthetic rubbers as indicated by the specific examples given hereafter. As a matter of fact, in some cases this compound cures at a faster rate than is desirable, and in such cases the asymmetrical compound, which has a reduced curing activity, may be advantageously used. So far as we are aware the compounds defined by the above structural formula and also their use as curing agents for synthetic rubbers are new. Moreover, the exceptional activity of these compounds is surprising in view of the fact that other compounds which are chemically closely related to the compounds here claimed, e.g., trithiocyanuric acid exhibit little if any curing activity.

The curing agents of the present invention can be conveniently prepared from trithiocyanuric acid, which is a known compound according to the following equation:

(1)
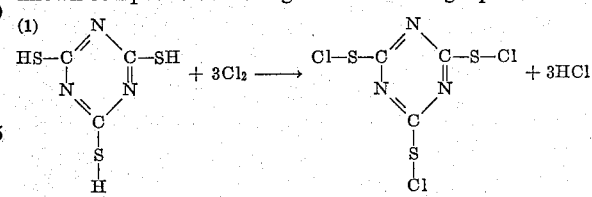

In accordance with one method that has been found satisfactory, the trithiocyanuric acid is slurried with a suitable organic solvent, e.g., carbon tetrachloride, and added to a solution of elemental chlorine in the same or a similar organic solvent. The reaction is carried out at somewhat below room temperature and the tri(sulfenyl chloride) formed is recovered by evaporation of the solvent as described more fully in the examples given below.

The asymmetrical triazine sulfenyl chloride derivative, can be prepared from the symmetrical compound by reaction with an unsaturated hydrocarbon such as isobutylene in accordance with the following equation:

(2)
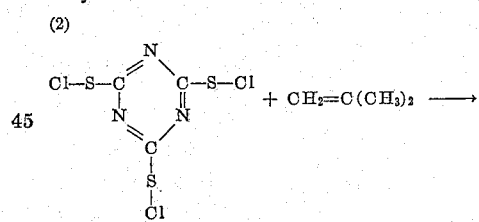

This reaction may be described as the "chemical capping" of one of the sulfenyl chloride groups of the symmetrical compound and serves to reduce the activity of the symmetrical compound by inactivating the chlorine in the capped moiety. Illustrative reaction conditions are given in the examples. It will of course be understood that other olefins may be substituted for the isobutylene indicated in Equation 2.

In order to point out more fully the nature of the present invention, the following examples are given illustrating modes of making the curing agents of the present invention and methods of curing unsaturated synthetic rubbers therewith.

Example 1

A solution of chlorine in carbon tetrachloride was prepared by dissolving 705 grams of chlorine gas in 2350 ml. of carbon tetrachloride at a temperature of −10° to −20° C. 500 grams of trithiocyanuric acid that had been recrystallized from dioxane was slurried in 1750 ml. of carbon tetrachloride, and the slurry was added to the chlorine solution over a three-hour period with stirring. Stirring was continued for 1½ hours at −10° C., and then the temperature of the mixture was permitted to rise to room temperature and the mixture allowed to stand for 16 hours.

At the end of this period the mixture was stirred for an additional six hours at room temperature, after which chlorine and hydrogen chloride in the gaseous phase above the liquid mixture were removed with a vacuum aspirator. The liquid reaction mixture was then filtered to remove solid residue therefrom and evaporated under a vacuum at 40° to 50° C., whereupon the triazine tri(sulfenyl chloride) crystallized out and was separated by filtration. The product crystals were washed with diethyl ether, dried and analyzed. The analytical results are compared below with the theoretical composition of 1,3,5-triazine-2,4,6-tri(sulfenyl chloride), the values being given in weight percent.

|          | Theoretical, percent | Found, percent |
|----------|----------------------|----------------|
| Sulfur   | 34.28                | 35.32          |
| Nitrogen | 15.00                | 15.01          |
| Chlorine | 37.96                | 38.04          |

Example 2

The product of Example 1 was "chemically capped" in the following manner: 14 grams of the product of Example 1 in 65 grams of toluene were placed in a pressure bottle and 0.89 gram of liquid isobutylene added thereto. The bottle was pressure-capped and maintained at Dry Ice temperatures with occasional swirling for 16 hours. The pressure bottle was then removed from its Dry Ice bath and maintained at ambient temperatures (approximately 75° F.) for 48 hours. The quantities of reactants used stoichiometrically correspond to a 1:1 molecular ratio, so that the quantity of reactive olefinic materials used was sufficient to react with one of the three reactive chlorine terminals of the tri(sulfenyl chloride).

At the end of the reaction period, the bottle was uncapped and there was no apparent pressure difference between the interior of the bottle and the atmosphere, thus indicating that the reaction had proceeded to form the asymmetrical triazine sulfenyl chloride previously described. The asymmetrical compound formed was insoluble in toluene and was separated from the reaction mixture by filtration and air dried. The resulting product was used to cure synthetic rubbers described in later examples.

Example 3

This example illustrates the curing of a butyl rubber that is a copolymer of isobutylene and isoprene wherein the relative amounts of isobutylene and isoprene copolymerized were such as to give a copolymer having a mol percent unsaturation of approximately 0.6 to 1.0. This butyl rubber is a commercial product sold under the trade name Enjay "Butyl 035."

75 grams of carbon black (Philblack A) and 7.5 grams of the product of Example 1 were incorporated in 150 grams of this copolymer on a mill, and the resulting material was pressed into a sheet at 2,000 p.s.i. The pressed sheet was maintained at a temperature of 310° F. for a period of 20 minutes and the cured sheet tested for tensile strength and hardness. The sheet exhibited a tensile strength of 960 p.s.i. and a hardness of 46 as measured on the "A" scale of a Shore durometer.

Example 4

This example illustrates the curing of a butyl rubber which was a copolymer of isobutylene and isoprene wherein the relative amounts of isobutylene and isoprene copolymerized were such as to yield a copolymer having a mol percent unsaturation of about 2.1 to 2.5 percent. This butyl rubber is a commercial product sold under the trade name Enjay "Butyl 325."

140 grams of carbon black (Philblack A) and 14 grams of the product of Example 1 were incorporated in 280 grams of this copolymer on a mill and pressed into sheets at 2,000 p.s.i. Portions of these sheets were cured for 10 minutes at several different temperatures as tabulated below and the tensile strength of the sheets and their hardness on the Shore A durometer were as tabulated below.

| Temperature of Cure | Hardness | Tensile Strength (p.s.i.) |
|---------------------|----------|---------------------------|
| 225° F.             | 70       | 1,300                     |
| 275° F.             | 64       | 1,025                     |
| 320° F.             | 60       | 1,200                     |

Example 5

A quantity of butyl rubber (Enjay Butyl 325) was cured with the product of Example 1 at room temperature. More particularly 120 grams of a furnace black and 10 grams of the product of Example 1 were incorporated in 200 grams of the butyl rubber on a mill and the milled product was pressed into a sheet. Portions of this sheet were cured at room temperature (74° to 79° F.) for varying periods of time and tested for hardness and tensile strength to yield the following results.

| Time of Cure | Shore "A" Hardness | Tensile, p.s.i. |
|--------------|--------------------|-----------------|
| 19 hrs.      | 64                 | 919             |
| 48 hrs.      | 74                 | 1,207           |
| 240 hrs.     | 75                 | 1,108           |

Example 6

This example illustrates the nature of the cure obtained by using the present products in terms of increase of viscosity as measured by the standard Mooney scorch viscosity procedure. A series of 5 samples were made up in accordance with the procedure of Example 4 but with the proportions being modified as indicated in the following table. In this table the weights of rubber and curing agent are given in grams. In the case of Sample E, the curing agent was replaced by trithiocyanuric acid to illustrate the fact that trithiocyanuric acid fails to produce an acceptable cure.

| Sample | "Butyl 325" | Example 1 curing agent |
|--------|-------------|------------------------|
| A      | 75          | 3.25                   |
| B      | 195         | 10                     |
| C      | 100         | 3                      |
| D      | 125         | 3.75                   |
| E      | 195         | 10 g. trithiocyanuric acid. |

These five samples were tested in accordance with the Mooney scorch procedure using a 1 minute heat up of the sample to the run temperature of 250° F., and employing the "small rotor" at a rotational speed of 2 cycles per minute. The test results were as indicated in the following table.

| Sample | Time for 4 point Rise, sec. | Time for 10 point Rise | Maximum Rise |
|---|---|---|---|
| A | 30 | 1 min | 106 in 8 min. |
| B | 45 | 1 min | 104 in 6 min. 20 sec. |
| C | 40 | 80 sec | 99 in 13 min. 20 sec. |
| D | 45 | 80 sec | 101 in 11 min. 30 sec. |
| E | | | No rise. |

*Example 7*

This example illustrates the curing of a liquid polybutadiene of approximately 2000 to 3000 molecular weight with the present curing agents. 10 parts by weight of the product of Example 1 was incorporated in 90 parts by weight of liquid polybutadiene on a mill and the milled product was formed into sheets. One sheet was permitted to cure at room temperature (approximately 75° F.) for 24 hours and another sheet was placed in an oven at 170° F. for 24 hours. Both sheets cured to a resilient rubber.

*Example 8*

The procedure of Example 7 was followed except that a liquid polyisoprene of approximately 2000 to 3000 molecular weight was substituted for the liquid polybutadiene of Example 7. The polyisoprene having the present product milled therein gave an ecceptable cure at both room temperature and at 170° F.

*Example 9*

26 parts by weight of the "capped" product of Example 2 was incorporated on a mill in 100 parts by weight of liquid polybutadiene of molecular weight between 2000 to 3000 to obtain an intimate mixing. The solid milled product was placed in an oven at 250° F. for a period of 70 hours and cured to a resilient rubber.

*Example 10*

In similar manner to Example 2, one mole of 1,3,5-triazine-2,4,6-tri(sulfenyl chloride) and one mole of 1-octene were reacted together as follows: a benzene solution of the 1,3,5-triazine-2,4,6-tri(sulfenyl chloride), in a 500 ml. reaction flask fitted with stirrer, thermometer, reflux condenser, and dropping funnel was reacted with 1-octene over a 3 hour period. This reaction mixture was permitted to stand for 16 hours and then was dried to a constant weight using an aspirator and roto-drier at 50° to 60° C. The products of the reaction were examined using infra-red spectroscopy, which revealed that all of the 1-octene had disappeared. The product corresponded to 1,3,5-triazine-6-(chlorooctyl(-2,4-di(sulfenyl chloride) where one of the chlorine moieties of 1,3,5-triazine-2,4,6-tri(sulfenyl chloride) added across the double bond of 1-octene. The dried product was paint milled with a liquid polybutadiene polymer of molecular weight 2000–3000 to secure an intimate mixing. This mixture was placed in a 250° F. oven for 70 hours and resulted in a cured rubber.

It is of course to be understood that the foregoing examples are illustrative only, and that numerous changes can be made in the ingredients, proportions and conditions specifically set forth therein without departing from the spirit of the invention as defined in the following claims.

We claim:

1. A vulcanizable composition comprising a soft hydrocarbon polymer selected from the group consisting of polybutadiene, polyisoprene and isobutylene-isoprene copolymers and a curing agent for said polymer of the formula $$Cl-S-C\underset{N}{\overset{N}{\underset{\|}{\diagup}}}\overset{}{\underset{C}{\diagdown}}C-S-Cl$$
$$\underset{Y}{\overset{|}{S}}$$

wherein Y is selected from the group consisting of —Cl and —R—Cl in which R is an alkylene group of 2 to 8 carbon atoms.

2. A vulcanizable composition comprising a major portion of a soft hydrocarbon polymer selected from the group consisting of polybutadiene, polyisoprene and isobutylene-isoprene copolymers and a minor portion of a curing agent for said polymer of the formula $$Cl-S-C\underset{N}{\overset{N}{\underset{\|}{\diagup}}}\overset{}{\underset{C}{\diagdown}}C-S-Cl$$
$$\underset{Y}{\overset{|}{S}}$$

wherein Y is selected from the group consisting of —Cl and —R—Cl in which R is an alkylene group of 2 to 8 carbon atoms.

3. The method of increasing the hardness and tensile strength of a soft hydrocarbon polymer selected from the group consisting of polybutadiene, polyisoprene and isobutylene-isoprene copolymers which comprises curing said polymer with a curing agent having the structural formula:

$$Cl-S-C\underset{N}{\overset{N}{\underset{\|}{\diagup}}}\overset{}{\underset{C}{\diagdown}}C-S-Cl$$
$$\underset{Y}{\overset{|}{S}}$$

wherein Y is selected from the group consisting of Cl and —R—Cl, where R is an alkylene group of 2 to 8 carbon atoms.

4. A method as defined in claim 3 wherein said curing agent is 1,3,5-triazine-2,4,6-tri(sulfenyl chloride).

5. A method as defined in claim 3 wherein asid curing agent is 1,3,5-triazine-6-(chloro-isobutyl)-2,4-di(sulfenyl chloride).

6. A method as defined in claim 3 wherein said curing agent is 1,3,5-triazine-6-(chloroctyl)-2,4-di(sulfenyl chloride).

7. A method as defined in claim 3 wherein said curing agent is used in a minor amount by weight calculated on the weight of said polymer.

8. A method as defined in claim 3 wherein said curing agent is used in an amount of from about 3% to about 26% by weight calculated on the weight of said polymer.

9. A method as defined in claim 3 wherein said curing agent and said polymer are cured at from about 74° F. to about 320° F.

10. A method as defined in claim 3 wherein said curing agent and said polymer are cured for from about ⅓ hour to about 240 hours.

References Cited by the Examiner

UNITED STATES PATENTS

| | | | |
|---|---|---|---|
| 2,952,291 | 9/1960 | Serniuk et al. | 260—79.5 |
| 2,953,563 | 9/1960 | Schaefer et al. | 260—791 |
| 3,106,555 | 10/1963 | Schwarze | 260—791 |

JOSEPH L. SCHOFER, *Primary Examiner.*

E. J. SMITH, *Assistant Examiner.*